(12) United States Patent
Lutz et al.

(10) Patent No.: US 6,416,078 B1
(45) Date of Patent: Jul. 9, 2002

(54) GAS BAG MODULE

(75) Inventors: Joachim Lutz, Schechingen; Timo Abele, Schwäbisch Gmünd, both of (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/618,901

(22) Filed: Jul. 18, 2000

(30) Foreign Application Priority Data

Jul. 22, 1999 (DE) .................................. 299 12 825 U

(51) Int. Cl.$^7$ .............................................. B60R 21/16
(52) U.S. Cl. ............................... 280/728.2; 280/728.3; 280/732; 280/736; 280/739
(58) Field of Search ........................... 280/728.3, 728.2, 280/732, 736, 739

(56) References Cited

U.S. PATENT DOCUMENTS

| 5,135,253 A | | 8/1992 | Hirashima et al. | |
| 5,344,184 A | * | 9/1994 | Keeler et al. | 280/730 R |
| 5,647,607 A | * | 7/1997 | Bolieau | 280/728.2 |
| 5,899,488 A | * | 5/1999 | Müller | 280/728.3 |
| 5,971,431 A | * | 10/1999 | Wohllebe et al. | 280/732 |
| 6,024,377 A | * | 2/2000 | Lane, Jr. | 280/728.3 |

FOREIGN PATENT DOCUMENTS

DE 19726878 A1 10/1998

* cited by examiner

*Primary Examiner*—Lanna Mai
*Assistant Examiner*—Paul Royal, Jr.
(74) *Attorney, Agent, or Firm*—Tarolli, Sundheim, Covell, Tummino & Szabo L.L.P.

(57) ABSTRACT

A gas bag module for a vehicle occupant restraint system has a gas bag, a gas generator being in flow connection with the gas bag, and at least one cover part adapted to cover the gas bag against a passenger compartment when the gas bag module is mounted in a vehicle. The cover part has a hinge portion which allows the cover part to pivot from a closed condition into an opened condition in which the gas bag is able to exit from the gas bag module, and further having an edge opposite the hinge portion. At least one traction transfer device is provided which has a first and a second end and is adapted to exert a tensile force on the cover part after activation of the gas generator. The first end of the traction transfer device is attached to the edge of the cover part so that the cover part opens in a direction towards the gas bag due to the tensile force exerted by the traction transfer device.

12 Claims, 7 Drawing Sheets

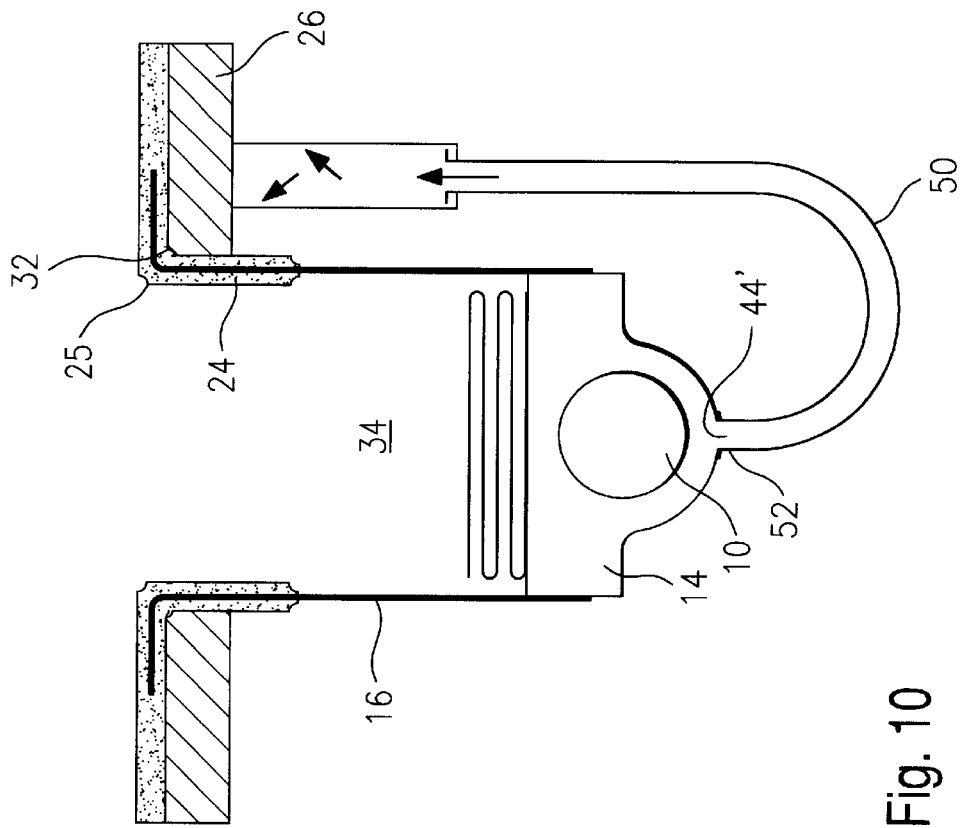
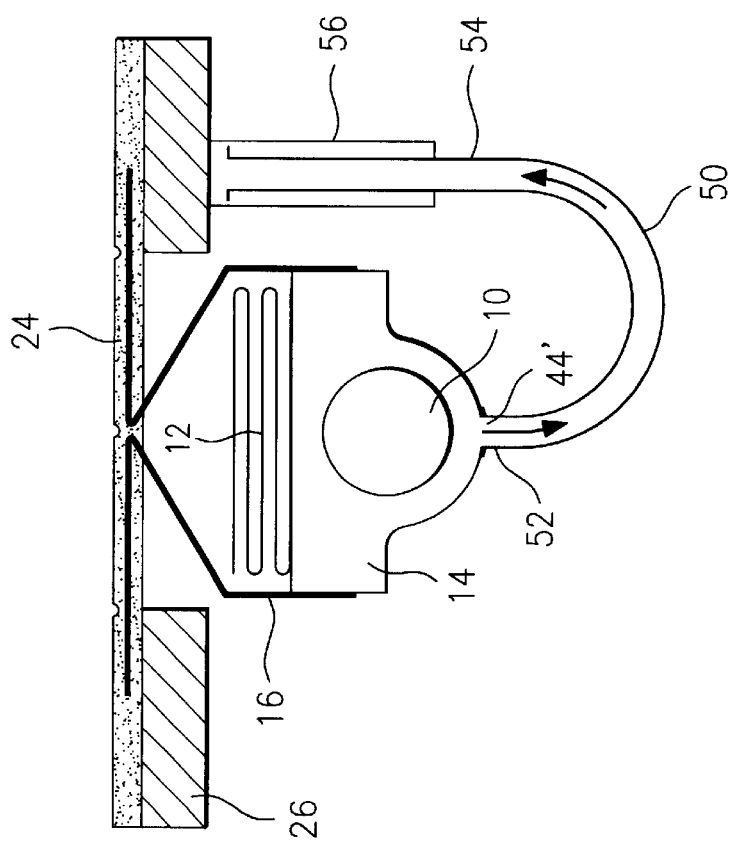
Fig. 10
Fig. 9

GAS BAG MODULE

TECHNICAL FIELD

The invention relates to a gas bag module for a vehicle occupant restraint system.

BACKGROUND OF THE INVENTION

In German Utility Model 297 21 682 is shown a gas bag module for a vehicle occupant restraint system, comprising a gas bag, a gas generator being in flow connection with the gas bag, and at least one cover part covering the gas bag against a passenger compartment when the gas bag module is mounted in a vehicle. The cover part is pivoted about a hinge portion after activation of the gas generator in order to enable the aid gas bag to exit into the passenger compartment. There is provided at least one traction transfer means having a first and a second end. The first end is attached to the cover part, and the traction transfer means exerts a tensile force on the cover part when the gas generator is activated. This construction reduces the risk of a vehicle occupant being injured by a cover which is opening. One drawback of this solution resides in that the cover members are guided in an expensive manner. Moreover, a great tensioning is required in the traction transfer means, due to the force reversal effected by the guide and the friction associated therewith, for the cover to burst at the predetermined breaking-point provided therefor.

The aim of the invention is to provide a gas bag module in which the cover may be opened in a simple manner without any risk existing for the vehicle occupants in case of activation.

SUMMARY OF THE INVENTION

The invention provides a gas bag module for a vehicle occupant restraint system, comprising a gas bag, a gas generator being in flow connection with the gas bag, and at least one cover part adapted to cover the gas bag against a passenger compartment when the gas bag module is mounted in a vehicle. The cover part has a hinge portion which allows the cover part to pivot from a closed condition into an opened condition in which the gas bag is able to exit from the gas bag module, and further having an edge opposite the hinge portion. At least one traction transfer means is provided which has a first and a second end and is adapted to exert a tensile force on the cover part after activation of the gas generator. The first end of the traction transfer means is attached to the edge of the cover part so that the cover part opens in a direction towards the gas bag due to the tensile force exerted by the traction transfer means. Due to this configuration, the cover part executes a very simple movement, namely some turning-in towards the gas bag. Thus, no guide is required for the cover part, which is why no frictional forces occur.

According to one embodiment of the invention, two cover parts are provided which are configured integrally with the instrument panel so that the gas bag may be accommodated to be invisible from the passenger compartment. In this case, there is provided an advantageous path of forces when the instrument panel is ripped up, since the opening force is introduced centrally.

A further embodiment of the invention provides a housing which surrounds the gas bag and the gas generator and is movable against the ejection direction of the gas bag in the case of triggering the gas generator, the traction transfer means being attached to the housing so that the opening force is introduced, by the housing movement, onto the cover parts via the traction transfer means and that the traction transfer means and the opened cover means constituting an ejection path for the gas bag in the activated condition of the gas generator. Thus, the gas bag may freely and rapidly unfold without any risk that it is damaged or gets stuck and suddenly unfolds when it is released again.

Further details and configurations of the invention read from the subclaims.

BRIEF DESCRIPTION OF THE DRAWINGS

The invention will now be described with reference to preferred embodiments shown in the accompanying figures.

FIG. 9 shows a schematic cross-section of a gas bag module according to a fifth embodiment of the invention in the rest position;

FIG. 10 shows the gas bag module of FIG. 9 after activation of the gas generator;

DETAILED DESCRIPTION OF THE INVENTION

Figure 1:
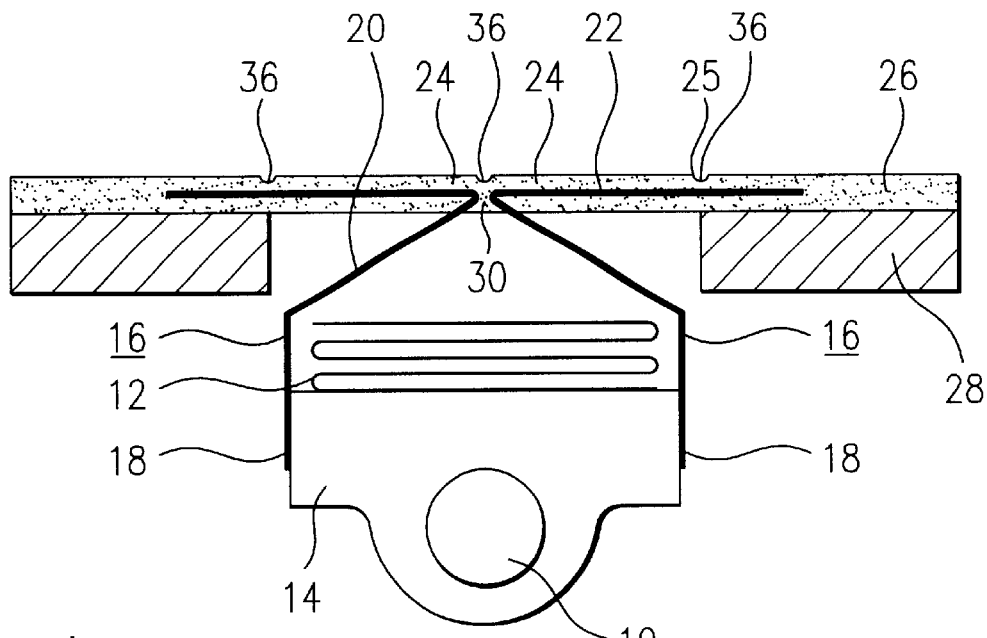
FIG. 1 shows a schematic cross-section of a gas bag module according to a first embodiment of the invention in the rest position.
Figure 2:
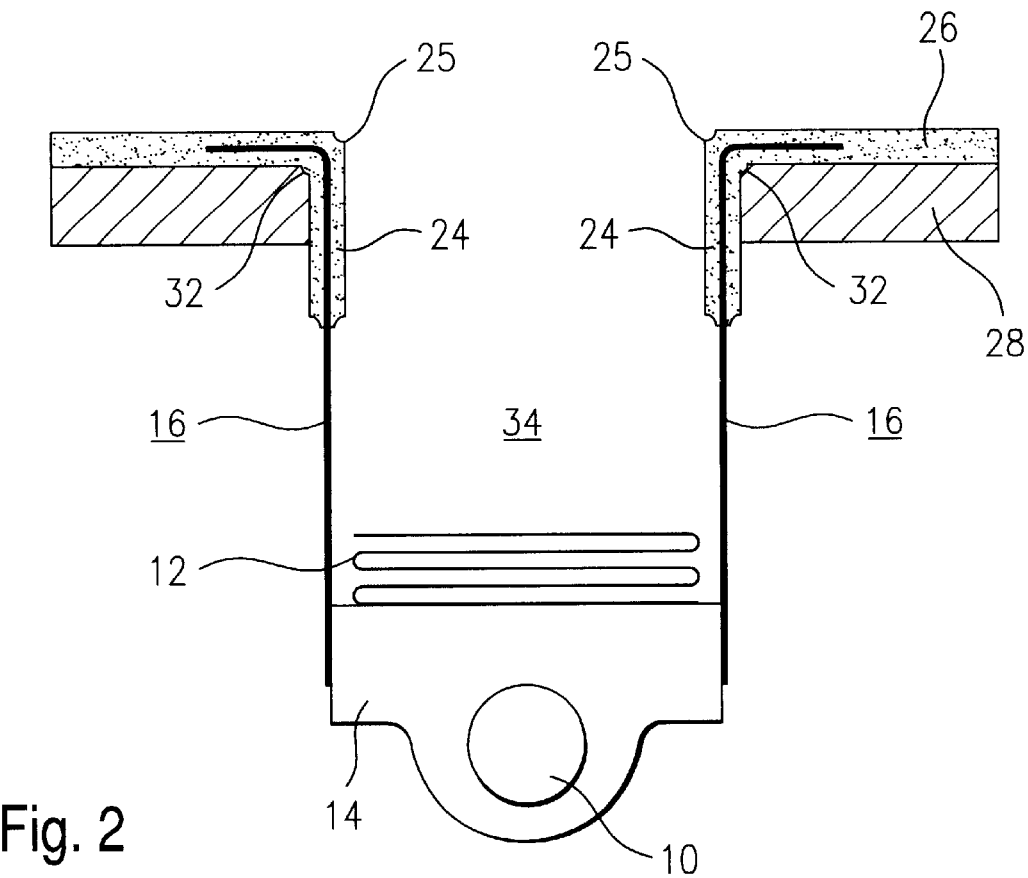
FIG. 2 shows the gas bag module of FIG. 1 after activation of the gas generator.

FIGS. 1 and 2 show a first embodiment of a gas bag module having a gas generator 10 and a gas bag 12 accommodated within a housing 14. Housing 14 is mounted within the vehicle such that it may move against the direction of ejection of the gas bag, i.e. downwardly with respect to the figure. Traction transfer means are provided on housing 14, which are formed as metal sheets 16 in the represented embodiment. The two sheets 16 respectively comprise a first portion 18 via which they are attached to the side wall of the housing. A following middle portion 20 is angled with respect to the first portion such that the central portions 20 of the two sheets extend towards each other. Along the line where they meet, sheets 16 are angled such that they form end portions 22 which extend in opposite directions perpendicularly with respect to the direction of ejection of the gas bag. Two cover parts 24 are integrally formed with the instrument panel 26 and, in the closed condition shown in FIG. 1, cover the exit opening of housing 14 towards the passenger compartment. The two cover parts 24 abut at each other along a center line 30 (perpendicularly with respect to the image plane) and merge into the instrument panel with hinge portions 25. End portions 22 of sheets 16 are embedded in cover parts 24. Central portions 20 exit from the cover parts in the vicinity of center line 30. The instrument panel is attached within the vehicle by means of a mounting 28. Instead of sheets 16, other traction transfer means like ribbons made of textile or other materials may be employed.

When gas generator 10 is activated, housing 14 moves downwardly with respect to the figure until it finally assumes the position shown in FIG. 2. Housing 14 may for instance be driven by a pyrotechnic unit, by a biased spring system, an electromechanical drive like an electromagnet or by the force of a gas generator, e.g. via diversion of the gas flow or the reaction forces developing when the gas bag unfolds. As a result of the tensile force introduced by sheets 16 onto cover parts 24, instrument panel 26 is ripped up along center line 30 between the two cover parts 24 and the two cover parts 24 are folded downwardly about bending edges 32 at hinge portions 25 into an opened condition shown in FIG. 2.

Sheets 16 are stretched and now constitute, together with cover parts 24, an ejection path 34 for the gas bag. In the surface of instrument panel 26 facing the vehicle occupant, there are mounted predetermined breaking lines 36 indicating the opening of the ejection path 34 and center line 30. Although these predetermined breaking lines 36 slightly facilitate the ripping-up and folding-in of instrument panel 26, they may as well be omitted when the gas bag module is to be accommodated invisible from the passenger compartment. Since the force is introduced into cover parts 24 along center line 30, the rip-up line is predetermined anyway. It is also possible to provide the predetermined breaking lines on center line 30 on the side facing away from the vehicle occupants.

Since no partition lines between cover parts 24 and instrument panel 26 are required for the function of the gas bag module, cover parts 24 may advantageously be formed integrally with instrument panel 26 from HR-foam, for instance. In the process, end portions 22 of sheets 16 or of corresponding other traction transfer means may advantageously be integrated simultaneously, such as by incorporation in foam, for instance. Housing 14 together with gas generator 10 and gas bag 12 are then attached to the first sections 18 of sheets 16 via the side faces in a known manner.

Figure 3:
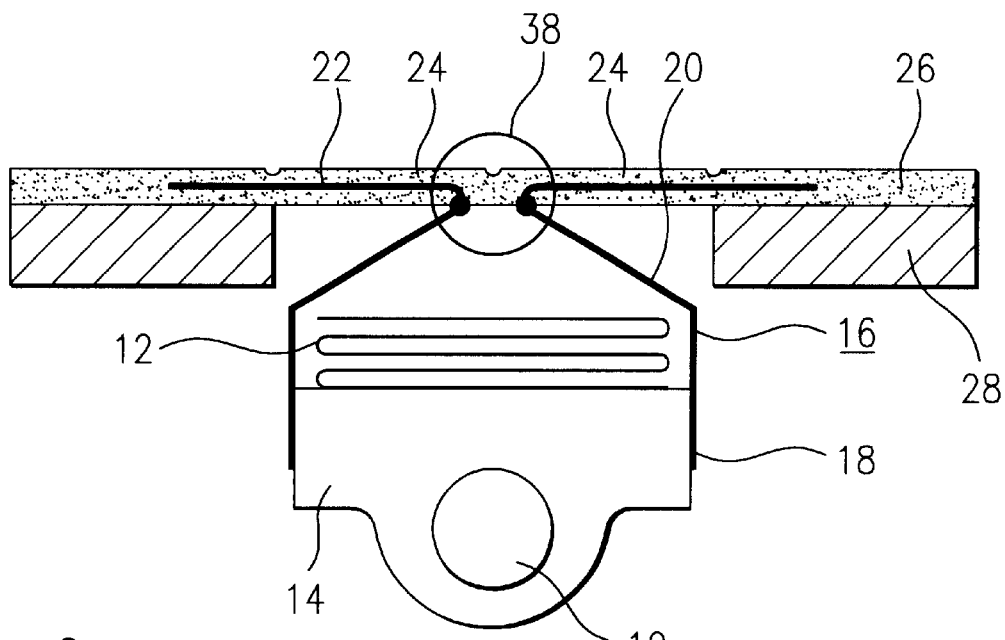
FIG. 3 shows a schematic cross-section of a gas bag module according to a second embodiment of the invention in the rest position.
Figure 4:
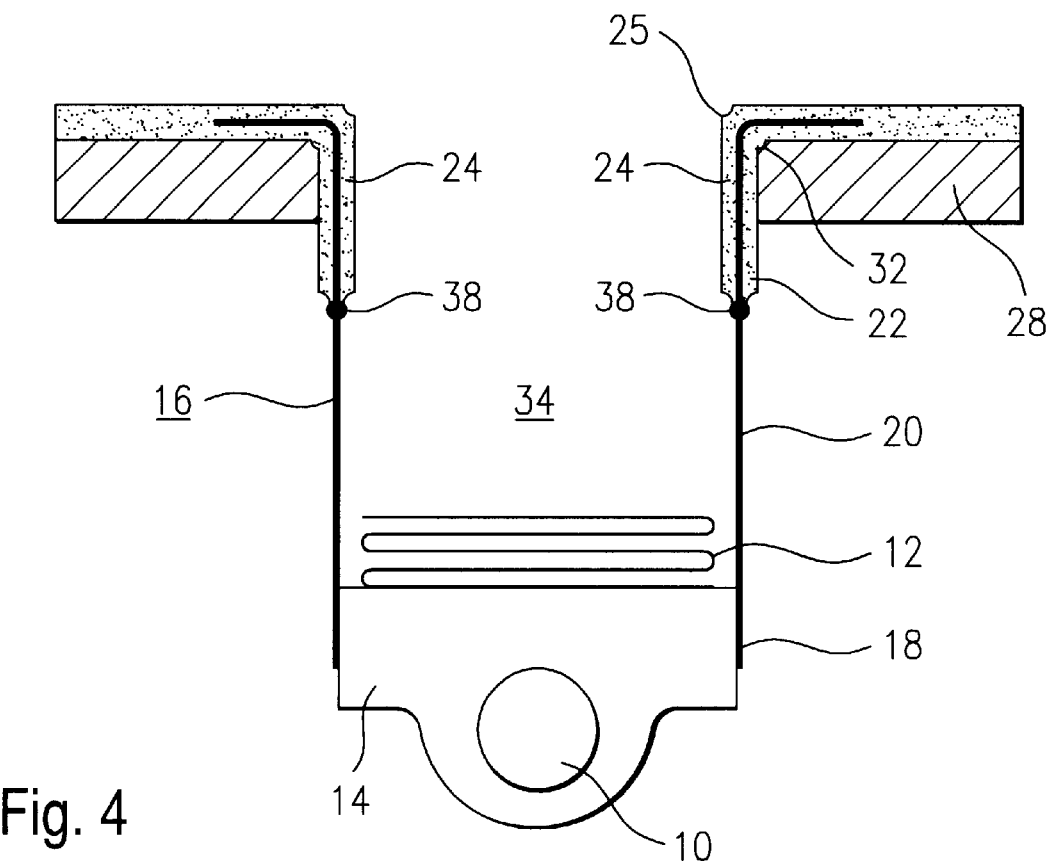
FIG. 4 shows the gas bag module of FIG. 3 after activation of the gas generator.

The example of a second embodiment of FIGS. 3 and 4 shows that sheets 16 may also comprise a separating point 38 between central portion 20 and end portion 22 which is embedded in cover parts 24. This results in the advantage during the manufacturing process that instrument panel 26 together with cover parts 24 may be manufactured without protruding sheet portions 18, 20. In this case these portions are already attached to the side faces of housing 14 and will become connected with end portions 22 at separating point 38 during assembly.

Figure 5:
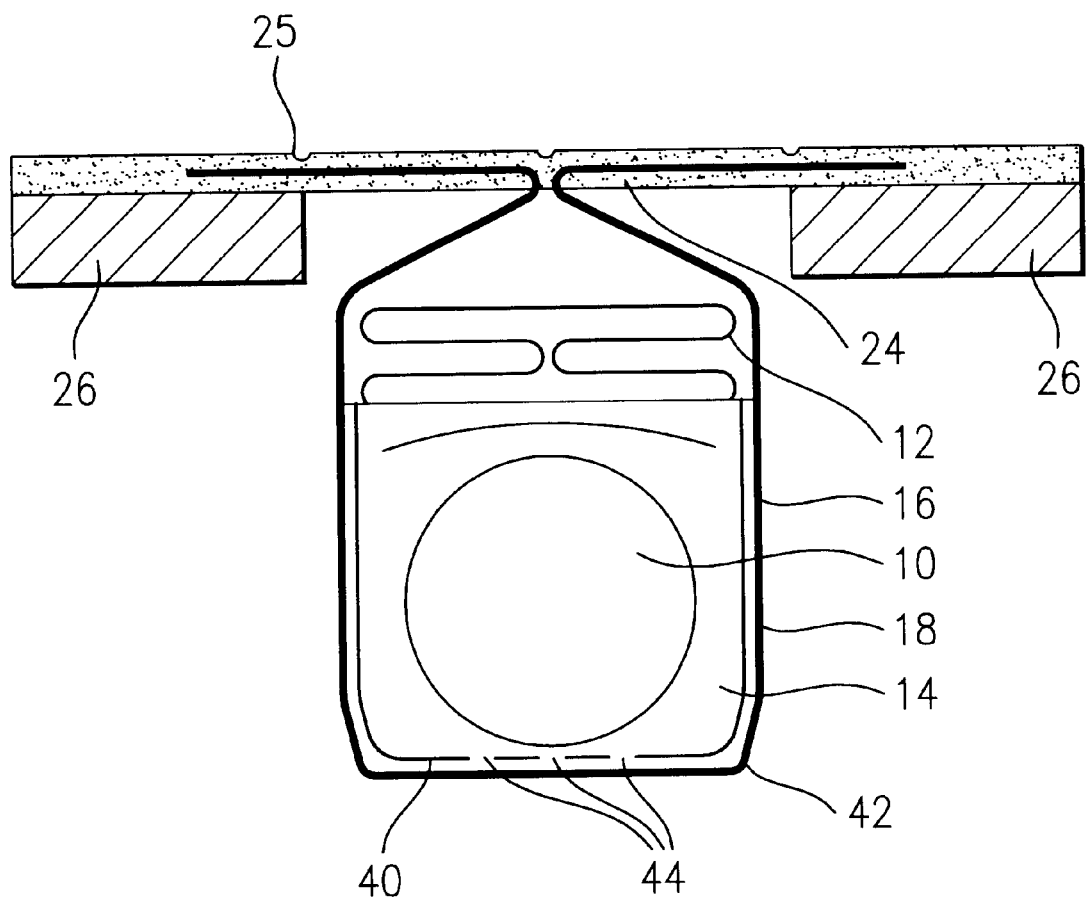
FIG. 5 shows a schematic cross-section of a gas bag module according to a third embodiment of the invention in the rest position.
Figure 6:
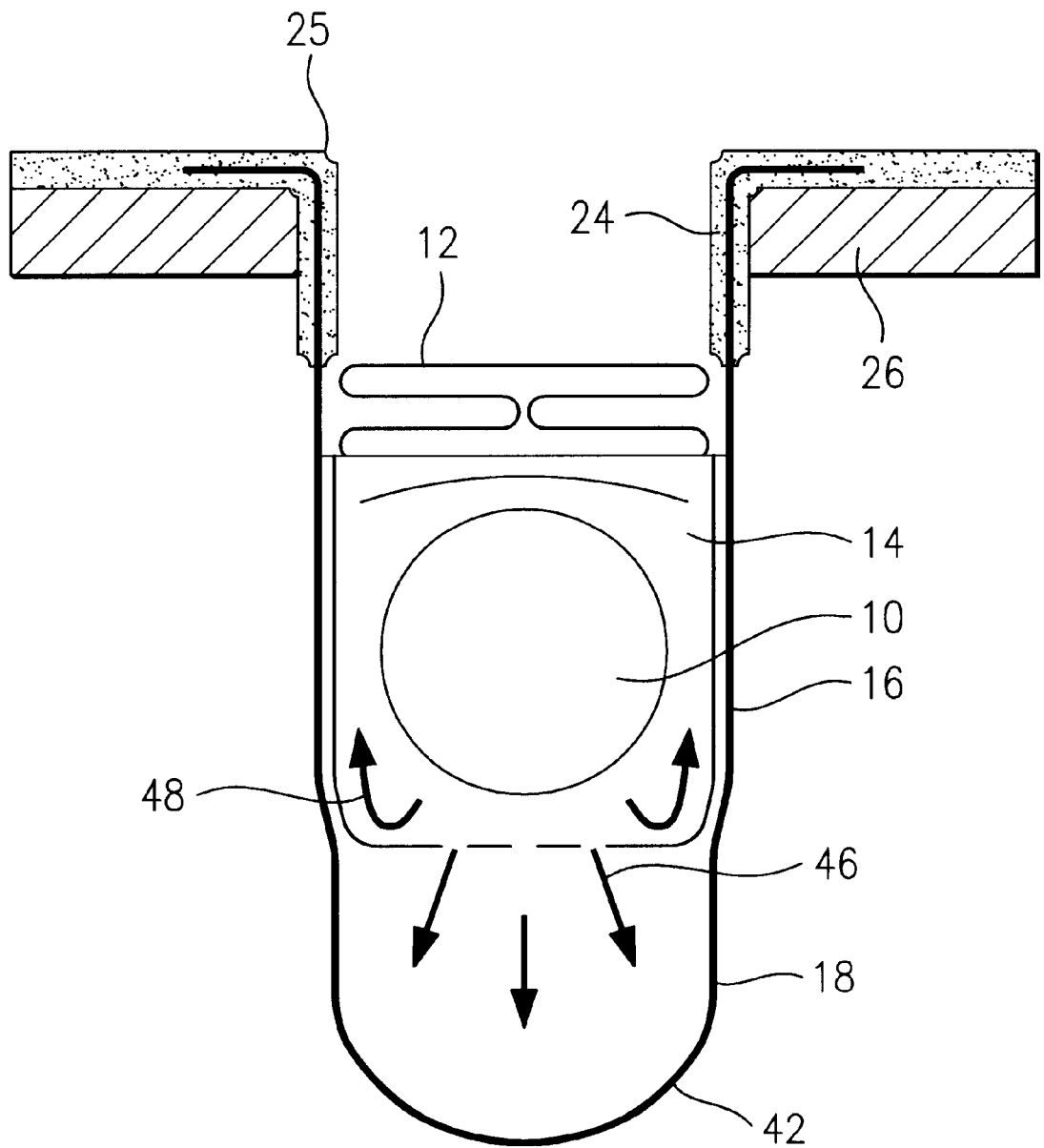
FIG. 6 shows the gas bag module of FIG. 5 after activation of the gas generator.
Figure 7:
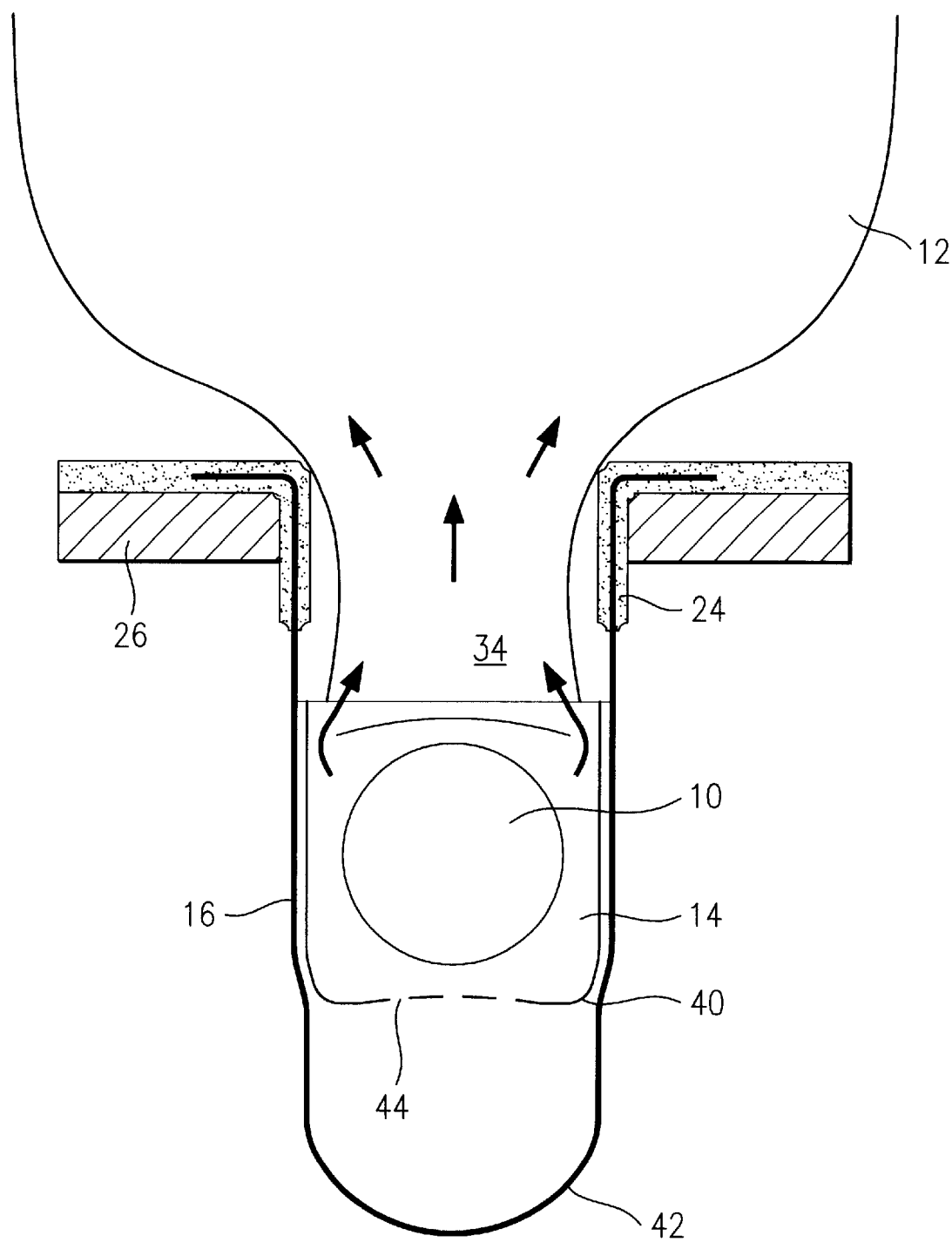
FIG. 7 shows the gas bag module of FIG. 5 with the gas bag unfolded.

A third embodiment is shown in FIGS. 5 to 7, wherein like reference numerals have been used for components already known. In this embodiment a moveable part is provided on the bottom side 40 of the housing 14 opposite the side where the gas bag is ejected. This moveable part covers the bottom side 40 and may be, as shown in the figures; a pouch 42 made of fabric put over the lower part of the housing 14. The interior of the pouch 42 is connected to the interior of the housing 14 via openings 44 in the bottom side 40. Unlike the previously described embodiment, the first section 18 of the traction transfer means 16 is attached to the rim of the pouch 42 rather than to the housing 14 of the gas bag module. Advantageously the pouch 42 and the traction transfer means 16 may be formed integrally, for instance there may be stripes of fabric formed at the rim of pouch 42 extending from the rim, the distal ends of these stripes being embedded into the cover parts 24.

Upon ignition of the gas generator 10 the generated gas is preferably dedicated to stream downwards first. This may be achieved by temporarily deviating the gas stream or by a two stage generator with a first stage exhausting substantially downwards. Alternatively an accessory generator may be implemented which is ignited first. This first gas stream 46 (FIG. 6) results in the pouch 42 being pushed away from the lower part of the housing, entraining the traction transfer means 16 and thus opening the cover as already described with reference to the first embodiment. Subsequently the second gas stream is conducted upwards or the second stage of a two stage generator blowing upwards is ignited, inflating the gas bag 12 which can unobstructedly be unfolded through the ejection path 34 constituted by the turned-in cover parts 24.

Figure 8C:
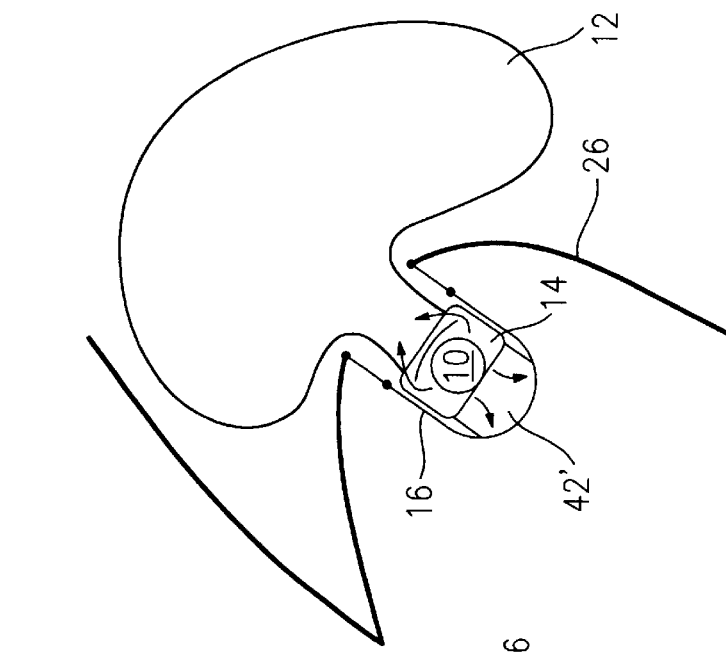
FIG. 8c shows the gas bag module of FIG. 8a with the gas bag unfolded.
Figure 8B:
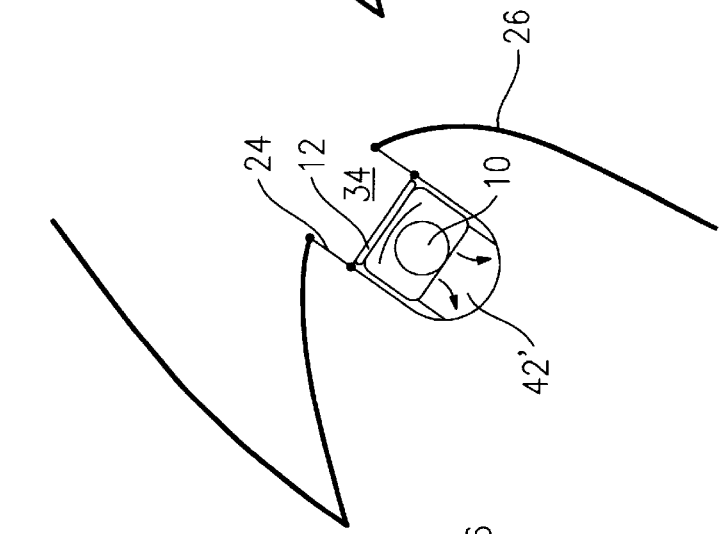
FIG. 8b shows the gas bag module of FIG. 8a after activation of the gas generator.
Figure 8A:
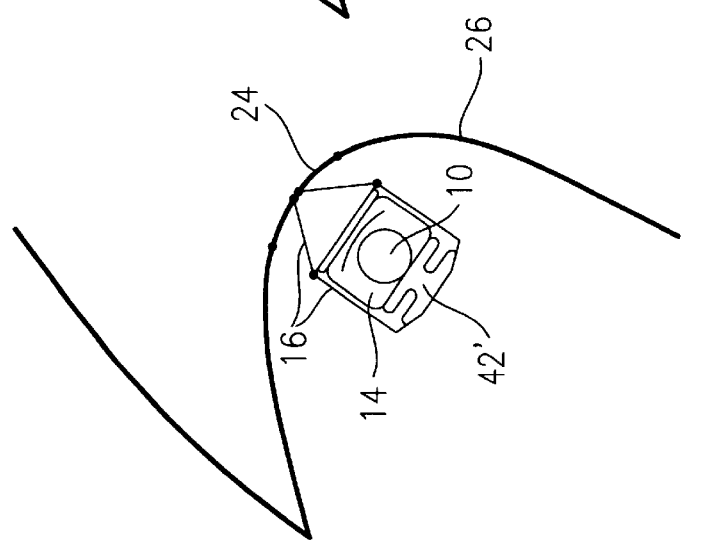
FIG. 8a shows a schematic cross-section of a gas bag module according to a fourth embodiment of the invention in the rest position.

The moveable part may alternatively have the form of a rigid container mounted for sliding movement against the ejection direction. Another variant may be a bellow 42' as shown in a fourth embodiment in FIG. 8a of sheet metal, plastics or fabric material. This bellow 42' is unfolded by the first gas stream from the gas generator (FIG. 8b) and exerts a tensile force on the cover parts 24 via the traction transfer means 16, resulting in the cover parts being turned inwards, constituting the ejection path 34 for the gas bag to unfold through (FIG. 8c).

In a fifth embodiment shown in FIGS. 9 and 10, the moveable part consists of the housing 14 and a rigid U-pipe 50 with a first end 52 and a second end 54, the first end 52 being fixed to the bottom side 40 of the housing 14 of the gas bag module. The interior of the U-pipe 50 is connected to the interior of the housing 14 via an opening 44' in the bottom side 40. The second end 54 of the U-pipe 50 discharges into a cylinder 56 attached to the instrument panel 26 on the side facing away from the occupants. The U-pipe 50 is guided sealed for sliding movement within the cylinder 56. As described with reference to the third embodiment, upon ignition of the gas generator 10, the gas is streaming downwards first and is directed through the U-pipe 50 into the cylinder 56. Since the cylinder 56 is substantially sealed, the U-pipe 50 is pushed out of the cylinder by the increasing pressure and is entraining the housing 14. As a result of the movement of the housing 14 the cover opens as already described above.

What is claimed is:

1. A gas bag module for a vehicle occupant restraint system, comprising a gas bag, a gas generator being in flow connection with said gas bag, at least one cover part adapted to cover said gas bag against a passenger compartment when said gas bag module is mounted in a vehicle, said cover part having a hinge portion which allows the cover part to pivot from a closed condition into an opened condition in which said gas bag is able to exit from said gas bag module, and further having an edge spaced apart from and opposite said hinge portion, and at least one traction transfer means being provided which has a first and a second end and is adapted to exert a tensile force on said cover part after activation of said gas generator, said first end of said traction transfer means being attached to said edge of said cover part so that said cover part opens in a direction towards said gas bag due to said tensile force exerted by said traction transfer means, said traction transfer means being unguided while moving said cover part in the direction towards said gas bag.

2. The gas bag module of claim 1, wherein said gas bag and said gas generator are surrounded by a housing which is provided with a movable part, said movable part transferring said tensile force onto said traction transfer means.

3. The gas bag module of claim 2, wherein said movable part is constituted by said housing.

4. The gas bag module of claim 1, wherein said traction transfer means is integrated into said cover part.

5. The gas bag module of claim 4, wherein said traction transfer means is integrated into said cover part by incorporation into foam.

6. The gas bag module of claim 1, wherein said cover part is formed integrally with an instrument panel and wherein said instrument panel bursts due to said tensile force.

7. The gas bag module of claim 6, wherein said instrument panel has a top surface which does not comprise any partition line in the deactivated state of said gas generator.

8. The gas bag module of claim 1, wherein two cover parts of substantially equal size are provided which abut at each other along a center line and wherein at least one of said traction transfer means is mounted on each cover part.

9. The gas bag module of claim 8, wherein in an activated state of said gas generator said traction transfer means and said cover parts opened in the direction towards said gas bag constitute an ejection path for said gas bag.

10. The gas bag module of claims 1, wherein said tensile force is applied by a pyrotechnic unit.

11. The gas bag module of claims 1, wherein said tensile force is applied by a mechanical unit.

12. A gas bag module for a vehicle occupant restraint system, comprising a gas bag, a gas generator being in flow connection with said gas bag, at least one cover part adapted to cover said gas bag against a passenger compartment when said gas bag module is mounted in a vehicle, said cover part having a predetermined tear line and a hinge portion around which said cover part pivots from a closed condition into an opened condition in which said gas bag is able to exit from said gas bag module, said cover, when in said opened condition, having an edge spaced apart from and opposite said hinge portion at the location of the tear line and, at least one traction transfer means having a first end and a second end, said traction transfer means exerting a tensile force on said cover part after activation of said gas generator, said first end of said traction transfer means being attached to said edge of said cover part at the location of said tear line so that said cover part opens upon tearing of said tear line in a direction towards said gas bag due to said tensile force exerted by said traction transfer means, said traction transfer means being unguided while moving said cover part in the direction towards said gas bag.

* * * * *